No. 700,052. Patented May 13, 1902.
C. DE KANDÓ.
ELECTRIC MOTOR CAR OR LOCOMOTIVE.
(Application filed Apr. 13, 1901.)
(No Model.)
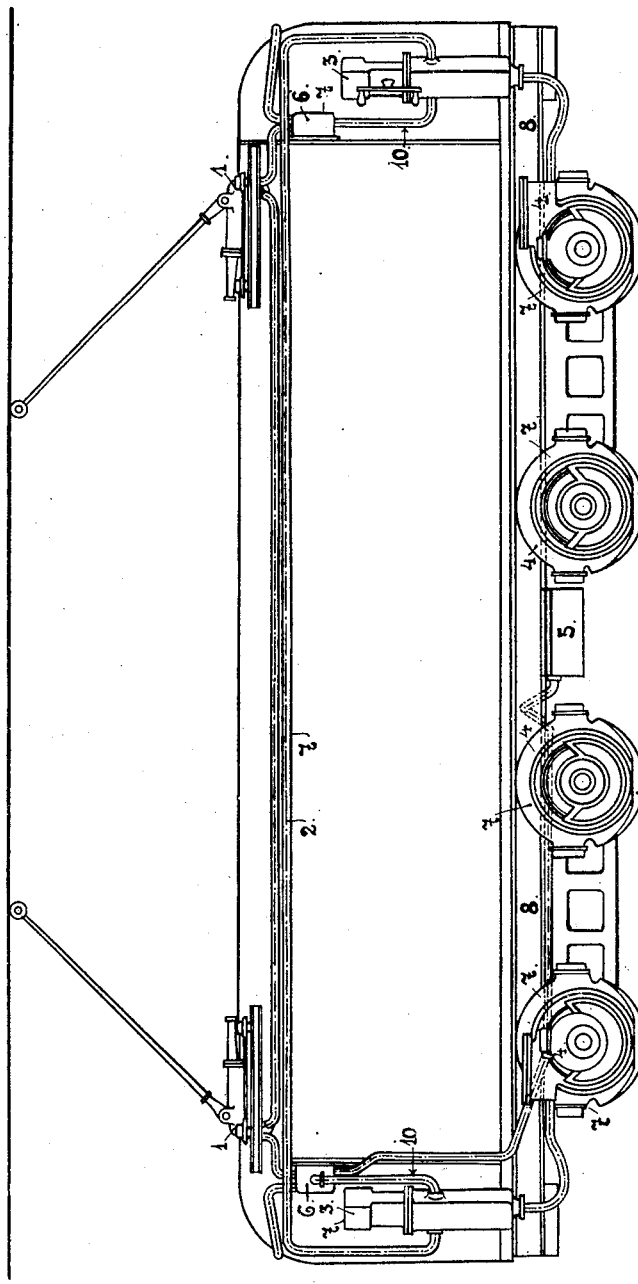
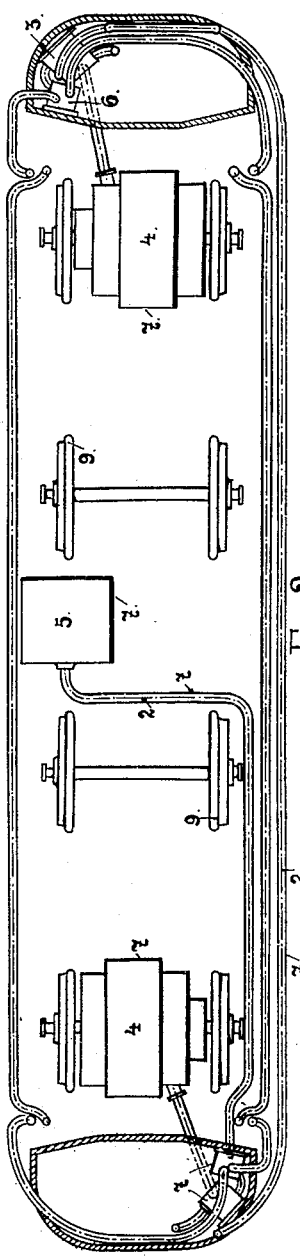
WITNESSES:
INVENTOR
COLOMAN DE KANDÓ
BY
HIS ATTORNEYS

UNITED STATES PATENT OFFICE.

COLOMAN DE KANDÓ, OF BUDAPEST, AUSTRIA-HUNGARY.

ELECTRIC MOTOR-CAR OR LOCOMOTIVE.

SPECIFICATION forming part of Letters Patent No. 700,052, dated May 13, 1902.

Application filed April 13, 1901. Serial No. 55,750. (No model.)

*To all whom it may concern:*

Be it known that I, COLOMAN DE KANDÓ, engineer, a subject of the Emperor of Austria-Hungary, residing at Budapest, Austria-Hungary, have invented a new and useful Improvement on Electric Motor-Cars or Locomotives, of which the following is a specification.

My invention has for its object to prevent the passing over of high-tension currents from the parts carrying the current on an electric motor-car to the car-body or other objects connected with and to persons being placed on the same or touching it, by which the danger inherent to the use of high tension is minimized.

The present invention is illustrated in the accompanying drawings, in which—

Figure 1 is a front elevation, and Fig. 2 a plan view, of an electric motor-car provided with the present protecting arrangement.

As shown in the drawings, my method consists essentially in covering all the conductors of high tension, beginning from trolley-pole stand 1, to the earthed terminals—as bare or insulated wires or cables 2, fuses, cut-outs, controllers 3, motors 4, transformers 5, rheostats, distributing-boxes 6, condensators, induction-coils, &c.—with a metallic protecting device 7, which may consist of iron, brass, lead, &c., and in connecting the same to earth by aid of the car-truck 8 and wheels 9 or by separate contact-skates sliding on the rails, yet not shown in the drawings. This protecting metallic covering does not form a part of the current-circuit, but is carefully insulated therefrom. It has, however, its various sections carefully connected electrically. The parts of this metallic protecting device, as tubes 7 or boxes, plates, and other suitable shaped casings, may be electrically connected together by metallic screws, bolts, wires, cables, ribbons, sliding contacts, &c. For instance, in the drawings the protecting-tubes for the cables are supposed as making electrical connection between the protecting-incasings of the single controlling and moving devices—as, for example, the distributing-box 6 and controller-box 3 are connected by means of the tube 10. In this case one earthing connection may be sufficient for the whole protecting device, or single parts of it may be insulated from the others and earthed by separate conductors, which may be connected at one or more points to the truck or to the contacts sliding on the rails, or be connected in parallel to one common earthing-conductor.

The electromotors 4, transformers 5, and other electromagnetic apparatus containing iron cores may be designed in a manner, that parts of the iron cores or the metallic devices securing them should make part of the protecting-boxes and be earthed, disposition supposed in the drawings.

I do not hold latter method concerning the protection against shocks from motors and transformers for new.

I claim as my invention—

1. An electric motor-car or electric locomotive for high-tension electric systems, having the conductors, motors and all parts carrying current within the car inclosed by but insulated from metallic covers surrounding and protecting all such insulated parts, such metallic covers not being part of the electric circuit, but means being provided to electrically connect said covers to the rails, substantially as and for the purpose described.

2. An electric motor-car or electric locomotive for high-tension systems, having the current-carrying parts inclosed within but insulated from protective metallic covers electrically connected to the wheels of the vehicle, to form an earth connection for the said covers, as and for the purpose described.

In testimony whereof I have signed my name to this specification in the presence of two subscribing witnesses.

COLOMAN DE KANDÓ.

Witnesses:
PAUL JOSEPH TOMANÓCRY, Jr.,
PAUL BÓLUKCY.